(12) United States Patent
Barrell et al.

(10) Patent No.: US 8,886,880 B2
(45) Date of Patent: Nov. 11, 2014

(54) WRITE CACHE MANAGEMENT METHOD AND APPARATUS

(75) Inventors: Michael David Barrell, Superior, CO (US); Zachary David Traut, Denver, CO (US)

(73) Assignee: Dot Hill Systems Corporation, Longmont, CO (US)

(*) Notice: Subject to any disclaimer, the term of this patent is extended or adjusted under 35 U.S.C. 154(b) by 435 days.

(21) Appl. No.: 13/482,314

(22) Filed: May 29, 2012

(65) Prior Publication Data

US 2013/0326149 A1  Dec. 5, 2013

(51) Int. Cl.
*G06F 12/00* (2006.01)
*G06F 12/08* (2006.01)
*G06F 11/10* (2006.01)

(52) U.S. Cl.
CPC ........ *G06F 12/0891* (2013.01); *G06F 12/0804* (2013.01); *G06F 11/1076* (2013.01); *G06F 12/0868* (2013.01); *G06F 2212/262* (2013.01); *G06F 2211/1059* (2013.01); *G06F 2211/1009* (2013.01)
USPC ............ 711/113; 711/135; 711/103; 711/119

(58) Field of Classification Search
CPC ............ G06F 12/0866; G06F 12/0804; G06F 12/0868; G06F 12/0871; G06F 12/02; G06F 11/1076; G06F 2212/312; G06F 3/0689; G06F 3/0683
USPC .................................. 711/113, 135
See application file for complete search history.

(56) References Cited

U.S. PATENT DOCUMENTS

| | | |
|---|---|---|
| 5,381,528 A | 1/1995 | Brunelle |
| 5,410,653 A | 4/1995 | Macon, Jr. et al. |
| 5,522,054 A | 5/1996 | Gunlock et al. |
| 5,557,767 A | 9/1996 | Sukegowa |
| 5,600,817 A | 2/1997 | Macon, Jr. et al. |
| 5,619,723 A | 4/1997 | Jones et al. |
| 5,680,573 A | 10/1997 | Rubin et al. |
| 5,687,389 A | 11/1997 | Packer |
| 5,809,560 A | 9/1998 | Schneider |
| 6,047,359 A | 4/2000 | Fouts |
| 6,070,230 A | 5/2000 | Capps |
| 6,092,141 A | 7/2000 | Lange |
| 6,092,149 A | 7/2000 | Hicken et al. |
| 6,195,727 B1 | 2/2001 | Islam et al. |
| 6,226,713 B1 | 5/2001 | Mehotra |
| 6,249,804 B1 | 6/2001 | Lam |
| 6,286,080 B1 | 9/2001 | Galbraith et al. |
| 6,321,300 B1 | 11/2001 | Ornes et al. |
| 6,338,115 B1 | 1/2002 | Galbraith et al. |
| 6,349,326 B1 | 2/2002 | Lam |

(Continued)

*Primary Examiner* — Reginald Bragdon
*Assistant Examiner* — Hannah A Faye-Joyner
(74) *Attorney, Agent, or Firm* — Thomas J. Lavan

(57) ABSTRACT

A method for destaging data from a memory of a storage controller to a striped volume is provided. The method includes determining if a stripe should be destaged from a write cache of the storage controller to the striped volume, destaging a partial stripe if a full stripe write percentage is less than a full stripe write affinity value, and destaging a full stripe if the full stripe write percentage is greater than the full stripe write affinity value. The full stripe write percentage includes a full stripe count divided by the sum of the full stripe count and a partial stripe count. The full stripe count is the number of stripes in the write cache where all chunks of a stripe are dirty. The partial stripe count is the number of stripes where at least one chunk but less than all chunks of the stripe are dirty.

20 Claims, 12 Drawing Sheets

(56) References Cited

U.S. PATENT DOCUMENTS

| | | |
|---|---|---|
| 6,505,268 B1 | 1/2003 | Schultz et al. |
| 6,523,086 B1 | 2/2003 | Lee |
| 6,549,977 B1 | 4/2003 | Horst et al. |
| 6,567,892 B1 | 5/2003 | Horst et al. |
| 6,701,413 B2 | 3/2004 | Shirai et al. |
| 6,775,794 B1 | 8/2004 | Horst et al. |
| 6,789,171 B2 | 9/2004 | Desai et al. |
| 6,842,792 B2 | 1/2005 | Johnson et al. |
| 6,877,065 B2 | 4/2005 | Galbraith et al. |
| 6,910,099 B1 | 6/2005 | Wang et al. |
| 6,915,404 B1 | 7/2005 | Desai et al. |
| 6,931,486 B2 | 8/2005 | Cavallo et al. |
| 6,965,966 B1 | 11/2005 | Rothberg et al. |
| 7,069,354 B2 | 6/2006 | Pooni et al. |
| 7,120,753 B2 | 10/2006 | Accapadi et al. |
| 7,146,467 B2 | 12/2006 | Bearden et al. |
| 7,216,203 B1 | 5/2007 | Bagwadi |
| 7,302,530 B2 | 11/2007 | Barrick et al. |
| 7,318,142 B2 | 1/2008 | Accapadi et al. |
| 7,337,262 B2 | 2/2008 | Beeston et al. |
| 7,493,450 B2 | 2/2009 | Bearden |
| 7,523,259 B2 | 4/2009 | Pistoulet |
| 7,543,124 B1 | 6/2009 | Accapadi et al. |
| 7,724,568 B2 | 5/2010 | Arya et al. |
| 7,853,751 B2 | 12/2010 | Manoj |
| 7,996,623 B2 | 8/2011 | Walker |
| 8,074,020 B2 | 12/2011 | Seaman et al. |
| 8,356,126 B2 | 1/2013 | Ashmore |
| 2002/0069322 A1 | 6/2002 | Galbraith et al. |
| 2003/0041214 A1 | 2/2003 | Hirao et al. |
| 2003/0225977 A1 | 12/2003 | Desai et al. |
| 2004/0205298 A1 | 10/2004 | Bearden et al. |
| 2004/0205299 A1 | 10/2004 | Bearden |
| 2005/0021879 A1 | 1/2005 | Douglas |
| 2005/0060495 A1 | 3/2005 | Pistoulet |
| 2005/0235108 A1 | 10/2005 | Hiratsuka |
| 2005/0235125 A1 | 10/2005 | Accapadi et al. |
| 2006/0020759 A1 | 1/2006 | Barrick et al. |
| 2006/0248278 A1 | 11/2006 | Beeston et al. |
| 2006/0248387 A1 | 11/2006 | Nicholson et al. |
| 2006/0288186 A1 | 12/2006 | Accapadi et al. |
| 2007/0005904 A1 | 1/2007 | Lemoal et al. |
| 2007/0239747 A1 | 10/2007 | Pepper |
| 2007/0276993 A1 | 11/2007 | Hiratsuka |
| 2008/0005481 A1 | 1/2008 | Walker |
| 2009/0219760 A1 | 9/2009 | Arya et al. |
| 2010/0016283 A1 | 7/2010 | Alturi et al. |
| 2010/0208385 A1 | 8/2010 | Toukairin |
| 2011/0145508 A1 | 6/2011 | Pelleg et al. |
| 2012/0047548 A1 | 2/2012 | Rowlands et al. |
| 2012/0144123 A1 | 6/2012 | Aronovich et al. |

Fig. 2 Storage controller
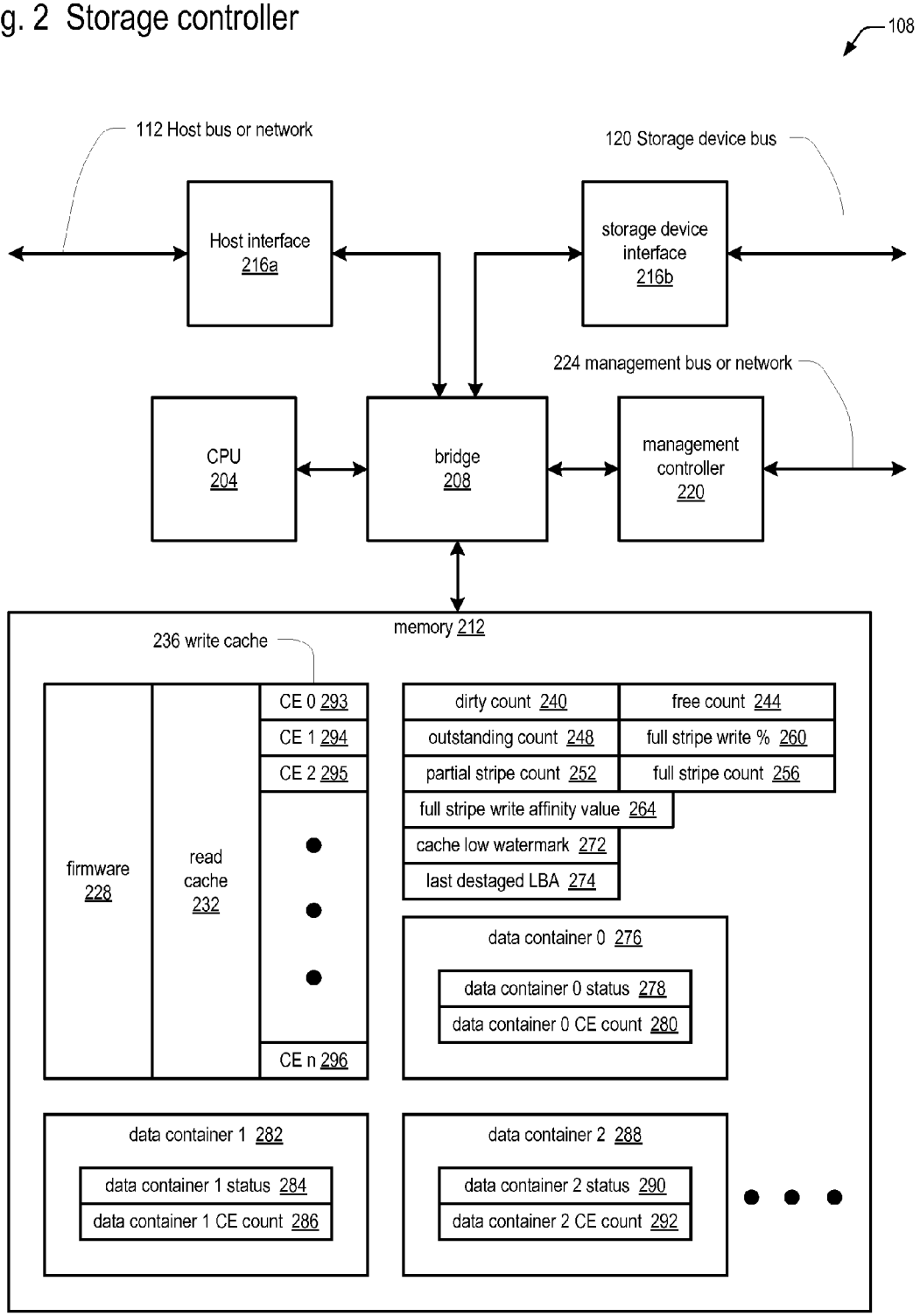

Fig. 3a Single storage device striped volume
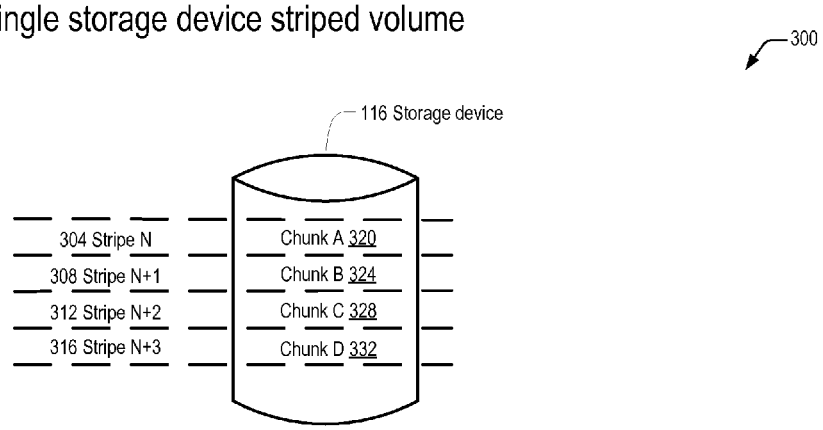
Fig. 3b Multiple storage device striped volume
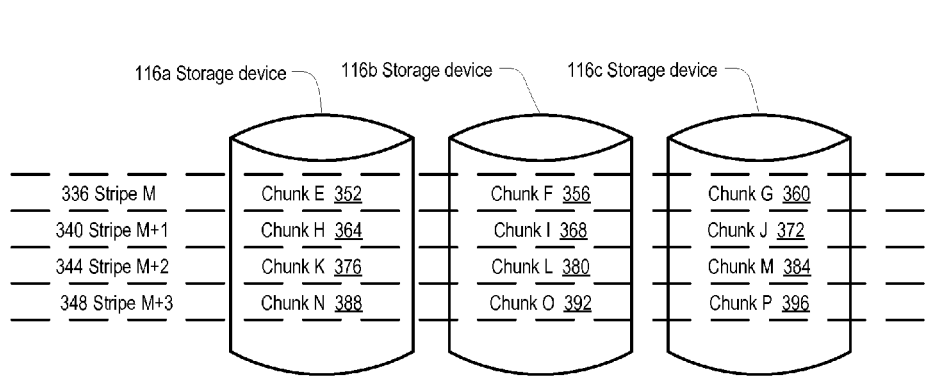

Fig. 4 Write cache data flow
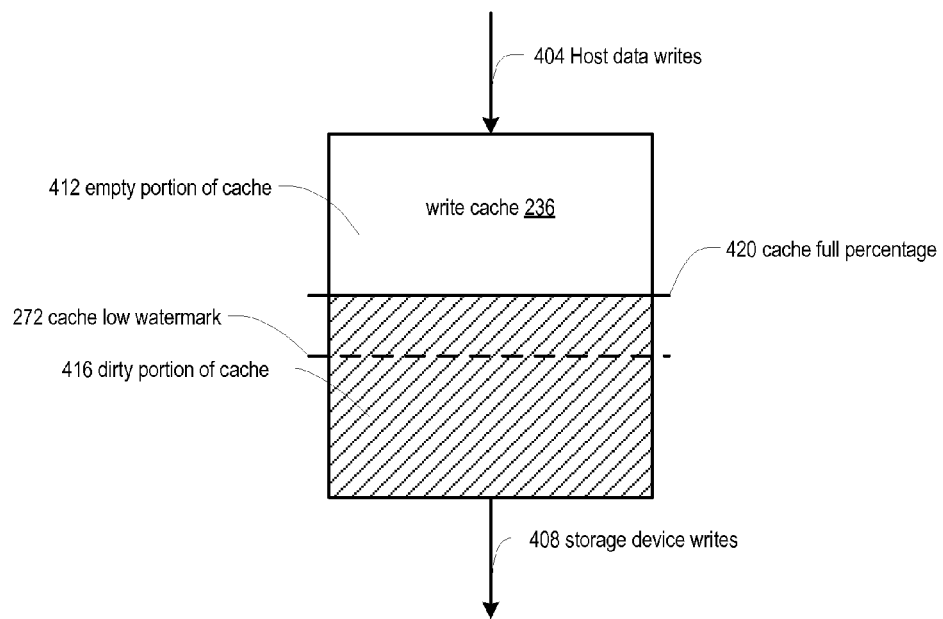

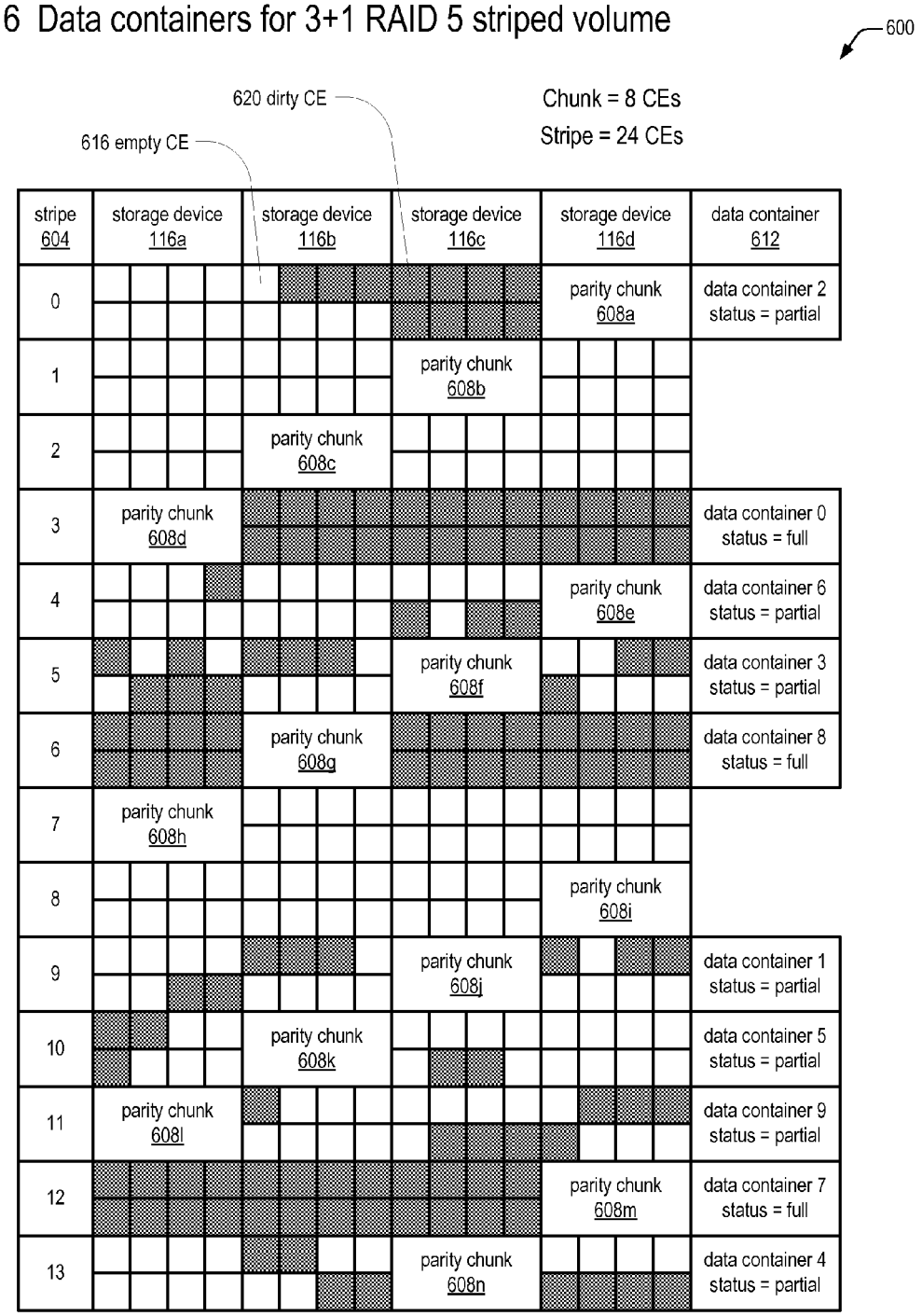
Fig. 6 Data containers for 3+1 RAID 5 striped volume

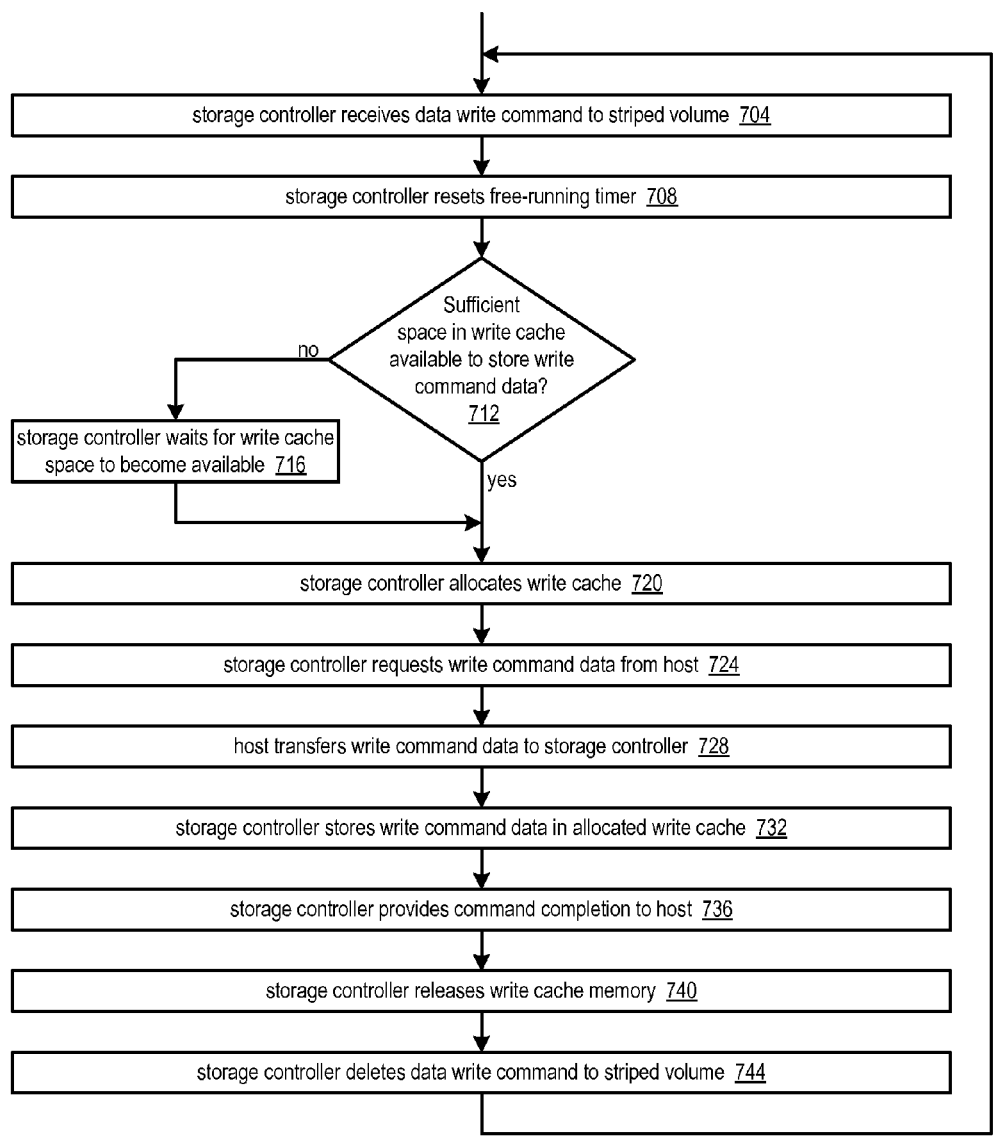
Fig. 7 I/O handling process

Fig. 8a  Write cache allocation process
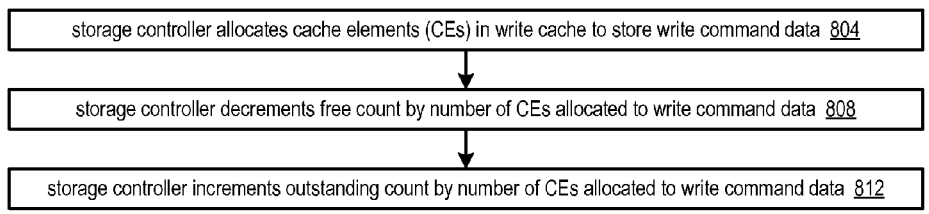
Fig. 8b  Write cache memory release process
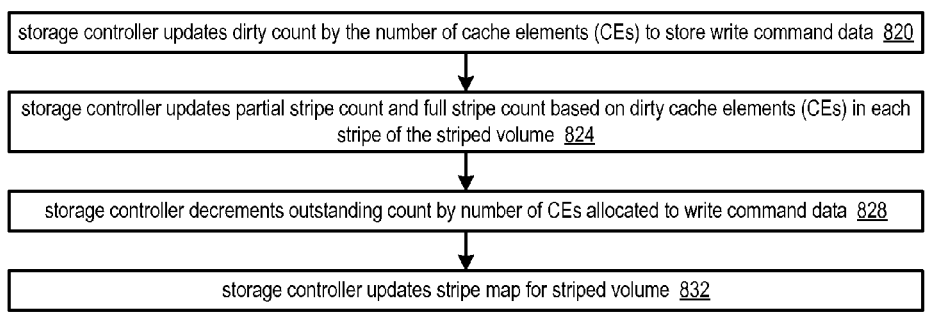

Fig. 9   Stripe map update process
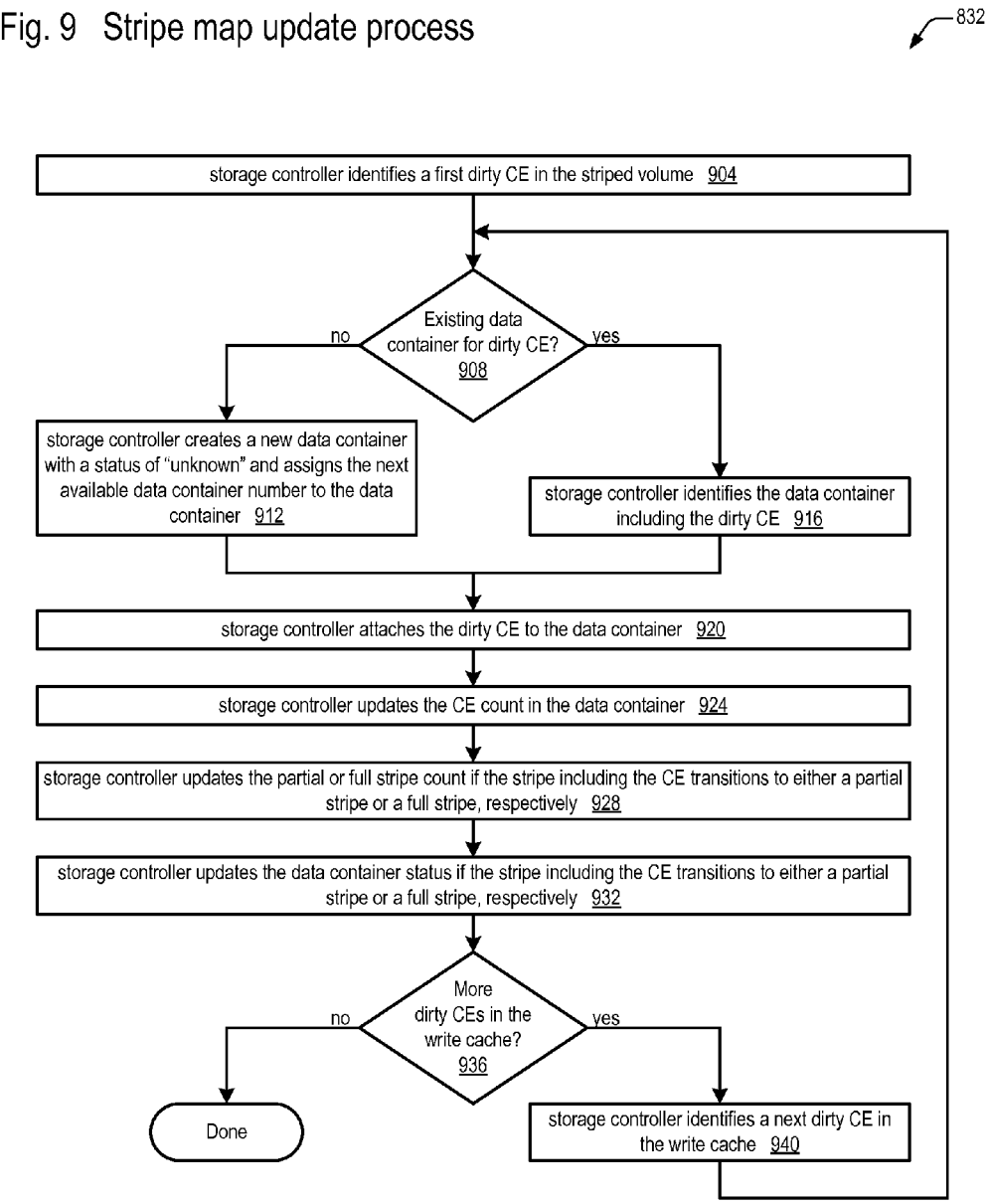

Fig. 10 Stripe destage process
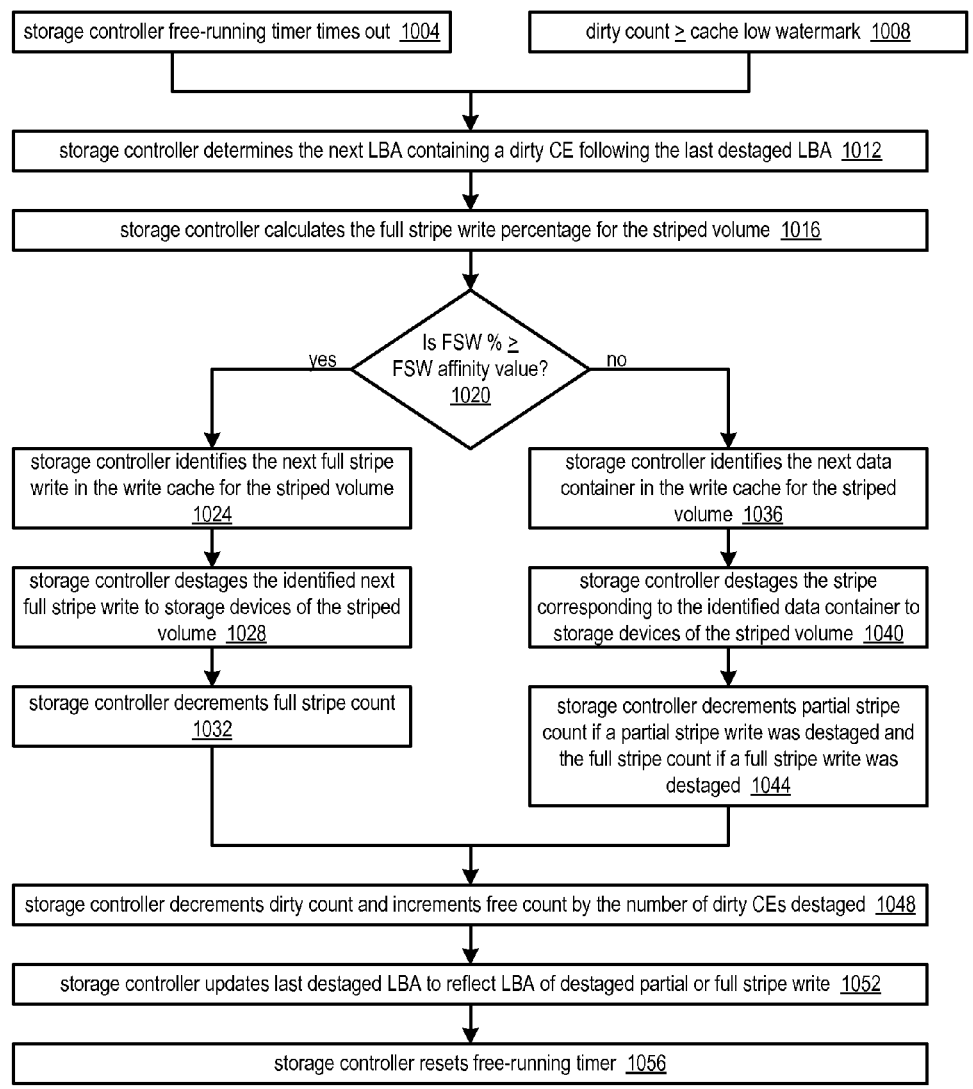

Fig. 11a  Calculation of full stripe write percentage storage controller obtains partial stripe count and full stripe count from memory 1104 storage controller divides the full stripe write count by the sum of the partial stripe write count and the full stripe write count, and multiplies by 100  1108

Fig. 11b  Calculation of full stripe write percentage example partial stripe count  252 full stripe count  256 full stripe write %  260 = 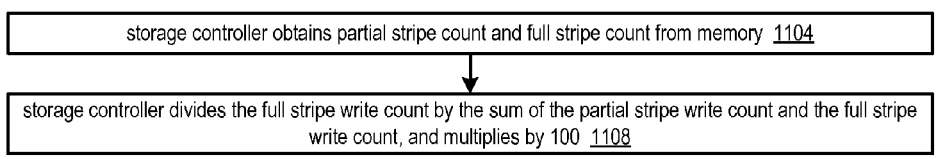 X 100

Partial stripe count = 80
Fulll stripe count = 50

$$\text{Full stripe write \%} = \frac{50}{80+50} \times 100 = \frac{50}{130} \times 100 = .38 \times 100 = 38\%$$

WRITE CACHE MANAGEMENT METHOD AND APPARATUS

FIELD

The present invention is directed to computer data storage systems. In particular, the present invention is directed to methods and apparatuses for efficiently destaging cache write data from a storage controller to storage devices of a striped volume.

BACKGROUND

In data storage systems, often data is stored with redundancy to protect against component failures resulting in loss of data. Such data redundancy can be provided by simple data mirroring or parity-based techniques. Conventional Redundant Array of Inexpensive Disks (RAID) stripe configurations effectively group capacity from all but one of the disk drives in a striped volume and write the parity (XOR) of that capacity on the remaining storage device (or across multiple storage devices). When there is a failure, the data located on the failed storage device is reconstructed using data from the remaining storage devices. The reconstruction process generally takes a series of data reads and data writes from the surviving storage devices.

When data is updated by a data write from a host computer to the storage system, the redundancy data (parity) must also be updated atomically on the striped volume to maintain consistency of data and parity for data reconstruction or recovery as needed. The parity update process is fairly straightforward for full stripe writes in a controller write cache memory. The portion of data in any one stripe of one storage device is called a strip or chunk. Parity is calculated as the XOR of all data chunks in the same stripe. Therefore, if all data chunks for the same stripe are already in the write cache (as would be the case for a full stripe write), all that is needed is to XOR all of the chunks in the same stripe together in order to obtain the parity chunk, and write the data chunks and new parity chunk to the striped volume.

Although full stripe writes are fairly straightforward and can be efficiently destaged from a cache memory in normal operation, partial stripe writes are often more complicated. Partial stripe writes are writes whereby less than all data chunks in a stripe have new (dirty) data. Therefore, the dirty data chunks are stored in the write cache and the unchanged (old) data chunks are stored in the striped volume. Depending on the number of storage devices in the striped array, it will be necessary to read the old chunks from the striped array, XOR the dirty chunks with the old chunks to obtain the new parity chunk, and write the dirty chunks and the new parity chunk to the striped volume. Because of a relatively high number of reads and writes to the striped volume, destaging partial stripe writes needs to be carefully planned in order to not significantly impact performance of the storage system.

SUMMARY

The present invention is directed to solving disadvantages of the prior art. In accordance with embodiments of the present invention, a method for destaging data from a memory of a storage controller to a striped volume is provided. The method includes determining, by a processor of the storage controller, if a stripe should be destaged from a write cache of the storage controller to the striped volume. If a stripe should be destaged, the method includes destaging, by the storage controller, a partial stripe from the write cache if a full stripe write percentage is less than a full stripe write affinity value and destaging, by the storage controller, a full stripe from the write cache if the full stripe write percentage is greater than the full stripe write affinity value. The full stripe write percentage includes a full stripe count divided by the sum of the full stripe count and a partial stripe count. The full stripe count is the number of stripes of the striped volume in the write cache where all chunks of a stripe are dirty. The partial stripe count is the number of stripes of the striped volume in the write cache where at least one chunk but less than all chunks of the stripe are dirty.

In accordance with other embodiments of the present invention, a storage controller for efficiently destaging data to a striped volume coupled to the storage controller is provided. The storage controller includes a processor and a memory, coupled to the processor. The memory includes a write cache for temporarily storing write data specified in a data write command, a full stripe write percentage, and a full stripe write affinity value. The processor determines if a stripe should be destaged from the write cache to the striped volume, wherein if the processor determines if a stripe should be destaged, the storage controller destages a partial stripe from the write cache if the full stripe write percentage is less than the full stripe write affinity value and destages a full stripe from the write cache if the full stripe write percentage is greater than the full stripe write affinity value. The full stripe write percentage includes a full stripe count divided by the sum of the full stripe count and a partial stripe count, and the full stripe count is the number of stripes of the striped volume in the write cache where all chunks of a stripe are dirty. The partial stripe count is the number of stripes of the striped volume in the write cache wherein at least one chunk but less than all chunks of the stripe are dirty.

In accordance with still other embodiments of the present invention, a system for efficiently destaging data is provided. The system includes a host computer for generating data write commands, a storage system coupled to the host computer, and a striped volume coupled to the storage controller. The striped volume includes a plurality of storage devices configured as a parity-based RAID volume. The storage system includes a storage controller, which includes a processor and a memory, coupled to the processor. The memory includes a write cache for temporarily storing write data specified in the data write commands, a full stripe write percentage, and a full stripe write affinity value. The processor determines if a stripe should be destaged from the write cache to the striped volume. If the processor determines if a stripe should be destaged, the storage controller destages a partial stripe from the write cache if the full stripe write percentage is less than the full stripe write affinity value and destages a full stripe from the write cache if the full stripe write percentage is greater than the full stripe write affinity value. The full stripe write percentage includes a full stripe count divided by the sum of the full stripe count and a partial stripe count. The full stripe count is the number of stripes of the striped volume in the write cache where all chunks of a stripe are dirty, and the partial stripe count is the number of stripes of the striped volume in the write cache where at least one chunk but less than all chunks of the stripe are dirty.

An advantage of the present invention is that it improves write performance to a striped volume by efficiently destaging write data from a storage controller write cache. Without an efficient means to destage stripes to a striped volume, one of two outcomes are likely. A storage controller may over-aggressively copy write data from the write cache to the striped volume, resulting in under-utilization of the write cache and little benefit to write caching in general. Alternatively, a storage controller may under-aggressively copy write data from the write cache to the striped volume, resulting in a full write cache. When the write cache is full, the storage controller must either delay new writes until space is available in the write cache, or else handle new writes in a write-through mode. Both results reduce performance.

Another advantage of the present invention is it is able to maintain a given amount of free space in a write cache of a storage controller, by managing a write cache watermark. A useful amount of free space will therefore be generally available in the write cache, increasing the likelihood that new writes will benefit from write caching performance improvements.

Additional features and advantages of embodiments of the present invention will become more readily apparent from the following description, particularly when taken together with the accompanying drawings.

BRIEF DESCRIPTION OF THE DRAWINGS

FIG. 2 is a diagram illustrating components of a storage controller in accordance with embodiments of the present invention.

FIG. 3a is a block diagram illustrating components of a single storage device striped volume in accordance with embodiments of the present invention.

FIG. 3b is a block diagram illustrating components of a multiple storage device striped volume in accordance with embodiments of the present invention.

FIG. 4 is a block diagram illustrating a write cache data flow in accordance with embodiments of the present invention.

FIG. 6 is a diagram illustrating exemplary data containers for a 3+1 RAID 5 striped volume in accordance with embodiments of the present invention.

FIG. 7 is a flowchart illustrating an I/O handling process in accordance with embodiments of the present invention.

FIG. 8a is a flowchart illustrating a write cache allocation process in accordance with embodiments of the present invention.

FIG. 8b is a flowchart illustrating a write cache memory release process in accordance with embodiments of the present invention.

FIG. 9 is a flowchart illustrating a stripe map update process in accordance with embodiments of the present invention.

FIG. 10 is a flowchart illustrating a stripe destage process in accordance with embodiments of the present invention.

FIG. 11a is a flowchart illustrating a calculation of full stripe write percentage in accordance with embodiments of the present invention.

FIG. 11b is a diagram illustrating an exemplary full stripe write percentage calculation in accordance with embodiments of the present invention.

DETAILED DESCRIPTION

The present inventors have observed various performance problems in certain I/O workloads from host computers to storage controllers. In particular, storage controller write caches may be difficult to manage efficiently. Although it is generally straightforward to determine when to destage full stripe writes from a write cache to a striped volume, the same cannot be said for partial stripe writes. Partial stripe writes present unique problems when a striped volume is a parity-based RAID volume. For a parity-based RAID volume, it is necessary to re-create the parity chunk for the stripe corresponding to either a partial stripe write or a full stripe write. The parity chunk is recomputed as the XOR of all the data chunks in the same stripe. For full stripe writes, all of the data chunks are already in the data cache. Therefore, updating the parity chunk simply involves XORing all of the data chunks in the data cache, and writing the resultant parity chunk to the parity chunk location in the striped volume. For partial stripe writes, less than all of the data chunks are already in the data cache. Therefore, all of the data chunks for the partial stripe that are not already in the data cache must be read from the striped volume. It is these additional reads from the striped volume that make the update for the parity chunk corresponding to a partial stripe write slower than the update for the parity chunk corresponding to a full stripe write.

Figure 1A:
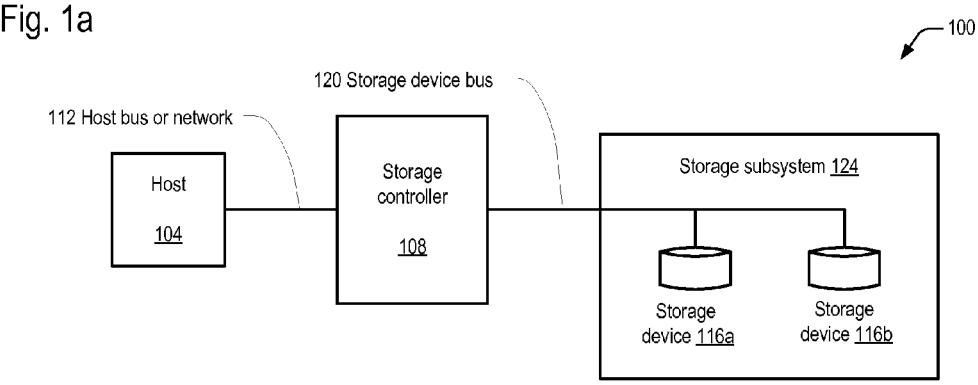
FIG. 1a is a block diagram illustrating components of a first non host-based electronic data storage system in accordance with embodiments of the present invention.

Referring now to FIG. 1a, a block diagram illustrating components of a first non host-based electronic data storage system 100 in accordance with embodiments of the present invention is shown. The electronic data storage system 100 includes one or more host computers 104. Host computer 104 is generally a server, but could also be a desktop or mobile computer. Host computer 104 executes application programs that generate read and write requests to storage controller 108 over host bus or network 112. Host bus or network 112 in one embodiment is a bus such as SCSI, FC-AL, USB, Firewire, SSA, SAS, SATA, or Infiniband. In another embodiment, host bus or network 112 is a network such as Ethernet, iSCSI, Fibre Channel, SSA, ESCON, ATM, FICON or Infiniband.

Host computer 104 interfaces with one or more storage controllers 108, although only a single storage controller 108 is illustrated for clarity. In one embodiment, storage controller 108 is a RAID controller. In another embodiment, storage controller 108 is a storage appliance such as a provisioning, virtualization, replication, or backup appliance. Storage controller 108 transfers data to and from storage devices 116a, 116b in storage subsystem 124, over storage device bus 120. Storage device bus 120 is any suitable storage bus or group of buses for transferring data directly between storage controller 120 and storage devices 116, including SCSI, Fibre Channel, SAS, SATA, or SSA.

Storage subsystem 124 in one embodiment contains twelve storage devices 116. In other embodiments, storage subsystem 124 may contain fewer or more than twelve storage devices 116. Storage devices 116 include various types of devices, including hard disk drives, solid state drives, optical drives, and tape drives. Within a specific storage device type, there may be several sub-categories of storage devices, organized according to performance. For example, hard disk drives may be organized according to cache size, drive RPM (5,400, 7,200, 10,000, and 15,000, for example), queue depth, random transfer rate, or sequential transfer rate.

Figure 1B:
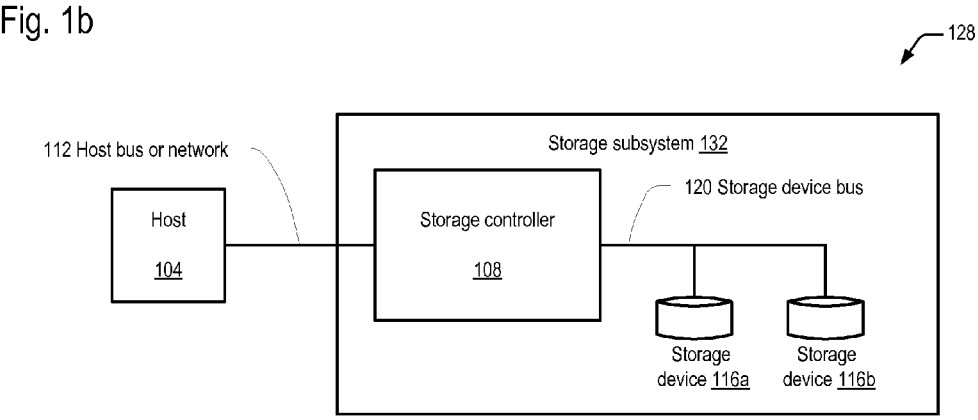
FIG. 1b is a block diagram illustrating components of a second non host-based electronic data storage system in accordance with embodiments of the present invention.

Referring now to FIG. 1b, a block diagram illustrating components of a second non host-based electronic data storage system 128 in accordance with embodiments of the present invention is shown. Non host-based electronic data storage system 128 is similar to non host-based electronic data storage system 100, with the exception being storage controller 108 is within storage system 132, along with storage devices 116. In one embodiment, storage controller 108 is a single RAID controller 108. In a second embodiment, storage controller 108 is a pair of redundant RAID controllers 108a, 108b.

Figure 1C:
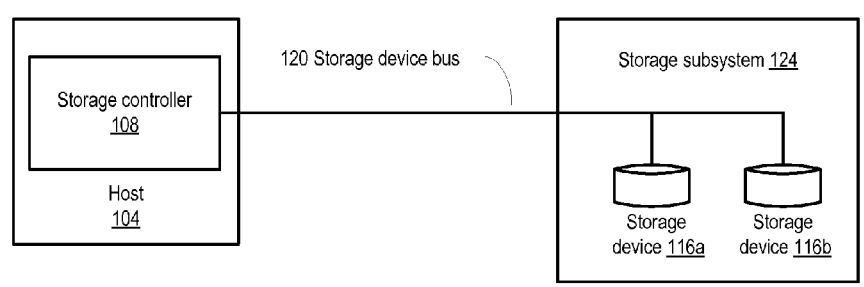
FIG. 1c is a block diagram illustrating components of a host-based electronic data storage system in accordance with embodiments of the present invention.

Referring now to FIG. 1c, a block diagram illustrating components of a host-based electronic data storage system 140 in accordance with embodiments of the present invention is shown. Electronic data storage system 140 is similar to electronic data storage systems 100 and 128, except storage controller 108 is within host computer 104. Storage controller 108 interfaces through a local bus of host computer 104, where the local bus may be any suitable bus for high speed transfers between the CPU of host computer 104 and storage controller 108, including PCI, PCI-X, or PCI Express. Storage controller 108 may either be integrated on the motherboard of host computer 104, or may be an add-in board or other form of assembly in host computer 104.

Referring now to FIG. 2, a block diagram of a storage controller 108 in accordance with embodiments of the present invention is shown. Storage controller 108 includes a CPU, or processor 204, which executes stored programs 228 that manage data transfers between host computers 104 and storage devices 116. CPU 204 includes any processing device suitable for executing storage controller 108 programs, such as Intel x86-compatible processors, embedded processors, mobile processors, and/or RISC processors. CPU 204 may include several devices including memory controllers, North Bridge devices, and/or South Bridge devices. Host computers 104 generate read and write I/O requests over host bus or network 112 to host Interface 216a. Multiple host computers 104 may interact with storage controller 108 over host bus or network 112.

CPU 204 is coupled to storage controller memory 212. Storage controller memory 212 generally includes both non-volatile memory and volatile memory. The memory 212 stores firmware 228 which includes program instructions that CPU 204 fetches and executes, including program instructions for the processes of the present invention. Examples of non-volatile memory include, but are not limited to, flash memory, SD, EPROM, EEPROM, hard disks, and NOVRAM. Volatile memory stores various data structures and in some embodiments contains a read cache 232, a write cache 236, or both. In other embodiments, the read cache 232, the write cache 236, or both, may be stored in non-volatile memory. Examples of volatile memory include, but are not limited to, DDR RAM, DDR2 RAM, DDR3 RAM, and other forms of temporary memory.

The write cache 236 of memory 212 includes a number of cache elements (CEs) 293, 294, 295, ... 296. CEs store write data from host computers 104, and are organized within chunks and stripes as illustrated in FIG. 6.

Memory 212 further includes stored parameters for a dirty count 240, a free count 244, an outstanding count 248, a partial stripe count 252 and a full stripe count 256, a full stripe write percentage 260, a cache low watermark 272, a last destaged Logical Block Address (LBA) 274, and a full stripe write affinity value 264. Each of these parameters will be discussed in more detail in the following diagrams and flowcharts. Although the remainder of the discussion assumes only a single striped volume, it should be understood the present invention supports any number of striped volumes—with repetition of the parameters shown for each striped volume.

Memory 212 may also contain one or more data containers 276, 282, 288. Data containers 276, 282, 288 store information related to data in write cache 236. Data container 0 276 includes data container 0 status 278, and data container 0 CE count 280. Data container 1 282 includes data container 1 status 284, and data container 1 CE count 286. Data container 2 288 includes data container 2 status 290, and data container 2 CE count 292. Data containers 276, 282, 288 are created when write data is placed in write cache 236, and is described in more detail with respect to FIG. 6. The number of data containers 276, 282, 288 per striped volume is limited by the size of write cache 236 and the number of stripes in a striped volume.

Storage controller 108 may have one host interface 216a, or multiple host interfaces 216a. Storage controller 108 has one or storage device interfaces 216b, which transfer data across one or more storage device buses 120 between storage controller 108 and one or more storage devices 116. CPU 204 generates target device I/O requests to storage device interface 216b. In various embodiments, the storage device interface 216b includes one or more protocol controllers, and one or more expanders.

In a preferred embodiment, storage controller 108 includes a bridge device 208, which interconnects CPU 204 with host interface(s) 216a, storage device interface(s) 216b, memory 212, and management controller 220. Bridge device 208 includes bus interfaces and buffering to process commands and data throughout storage controller 108, as well as memory and power control functions for memory 212. In a preferred embodiment, bridge device 208 also includes logical computation facilities for performing XOR operations for parity-related RAID striped volumes.

In some embodiments, storage controller 108 includes a management controller 220. CPU 204 reports status changes and errors to the management controller 220, which communicates status changes for storage controller 108 and errors to one or more users or administrators over management bus or network 224. Management controller 220 also receives commands from one or more users or system administrators over management bus or network 224. Management bus or network 224 is any bus or network capable of transmitting and receiving data from a remote computer, and includes Ethernet, RS-232, Fibre Channel, ATM, SAS, SCSI, Infiniband, or any other communication medium. Such a communication medium may be either cabled or wireless. In some storage controllers 108, status changes and errors are reported to a user or administrator through host interface 216a over host bus or network 112. This may either be in addition to, or in lieu of, management controller 220 and management bus or network 224.

It should be understood that storage controller 108 may be functionally organized in countless different functional organizations and architectures without diverting from the scope or operation of the present invention.

Referring now to FIG. 3a, a block diagram illustrating components of a single storage device striped volume 300, in accordance with embodiments of the present invention is shown.

A single storage device 116 may be a striped volume 300. Storage device 116 may be a hard disk drive, optical drive, tape drive, solid state device, or any other form of mass data storage device. A striped volume 300 is a logical volume comprising two or more evenly sized stripes. The portion of a stripe on one storage device 116 is a chunk.

FIG. 3a illustrates a striped volume 300 having four stripes: stripe N 304, stripe N+1 308, stripe N+2 312, and stripe N+3 316. Stripe N 304 has chunk A 320, stripe N+1 308 has chunk B 324, stripe N+2 312 has chunk C 328, and stripe N+3 316 has chunk D 332. Although FIG. 3a illustrates a single storage device striped volume 300 with four stripes 304, 308, 312, and 316 and four chunks 320, 324, 328, and 332, it should be understood that a single storage device striped volume 300 may have fewer than four stripes/chunks or more than four stripes/chunks. Additionally, a single storage device striped volume 300 may occupy only a portion of the available data storage space on a single storage device 116, and there may be other single storage device striped volumes 300 on the same storage device 116.

Referring now to FIG. 3b, a block diagram illustrating components of a multiple storage device striped volume 334 in accordance with embodiments of the present invention is shown.

Multiple storage devices 116, or a portion of multiple storage devices 116, may be a striped volume 334. FIG. 3b illustrates a striped volume 334 on three storage devices 116a, 116b, and 116c. Striped volume 334 has four stripes: stripe M 336, stripe M+1 340, stripe M+2 344, and stripe M+3 348. Stripe M 336 has chunks E 352, F 356, and G 360. Stripe M+1 340 has chunks H 364, I 368, and J 372. Stripe M+2 344 has chunks K 376, L 380, and M 384. Stripe M+3 348 has chunks N 388, O 392, and P 396. Although FIG. 3b illustrates a multiple storage device striped volume 334 with four stripes 336, 340, 344, and 348 and three storage devices 116a, 116b, and 116c, it should be understood that a multiple storage device striped volume 334 may have fewer or more than four stripes or fewer or more than three storage devices 116. As used in the present invention, a "striped volume 300, 334" may be either a single storage device striped volume 300 or a multiple storage device striped volume 334. Additionally, a multiple storage device striped volume 334 may occupy only a portion of the available data storage space on a group of storage devices 116, and there may be other multiple storage device striped volumes 334 on the same group of storage devices 116.

Referring now to FIG. 4, a block diagram illustrating a write cache 236 data flow in accordance with embodiments of the present invention is shown.

Write cache 236 is part of memory 212 of storage controller 108. Write cache 236 receives host data writes 404 from host computers 104 over host bus or network 112, and stores the write data in write cache 236 as dirty data. Dirty data is host write data 404 stored in the write cache 236 that has not yet been written to storage devices 116. Host data writes 404 are stored in the dirty portion of cache 416, awaiting conditions that will transfer storage device writes 408 from the dirty portion of cache 416 to striped volume 300, 334. Storage device writes 408 are either partial stripe writes or full stripe writes.

A cache low watermark 272 is maintained by the storage controller 108 to determine when partial or full stripes should be destaged from the write cache 236 to the striped volume 300, 334. The specific value selected for cache low watermark 272 depends on many factors, including size of the write cache 236, rate at which host data writes 404 are received, processing speed of storage controller 108 and CPU 204, and expected usage of storage controller 108. It is desirable to set the cache low watermark 272 at a level such that when an expected maximum rate of host data writes 404 are received, the CPU 204 and storage controller 108 are able to destage storage device writes 408 to keep the empty portion of cache 412 nonzero. In one embodiment, the cache low watermark 272 is at 50% of the capacity of write cache 236. In another embodiment, the cache low watermark 272 is at 80% of the capacity of write cache 236. However, in other embodiments, the cache low watermark 272 may be sent to a different level other than 50% or 80% of the capacity of write cache 236.

As host data writes 404 are received and written into write cache 236, the dirty portion of cache 416 expands accordingly, as long as sufficient space to store the new host data writes 404 is present in write cache 236. At the same time dirty portion of cache 416 expands, empty portion of cache 412 contracts. Similarly, as storage device writes 408 transfer data from the write cache 236 to the striped volume 300, 334, the dirty portion of cache 416 contracts and empty portion of cache 412 expands accordingly. Storage controller 108 maintains a cache full percentage 420, which tracks the current size of the dirty portion of cache 416.

Figure 5A:
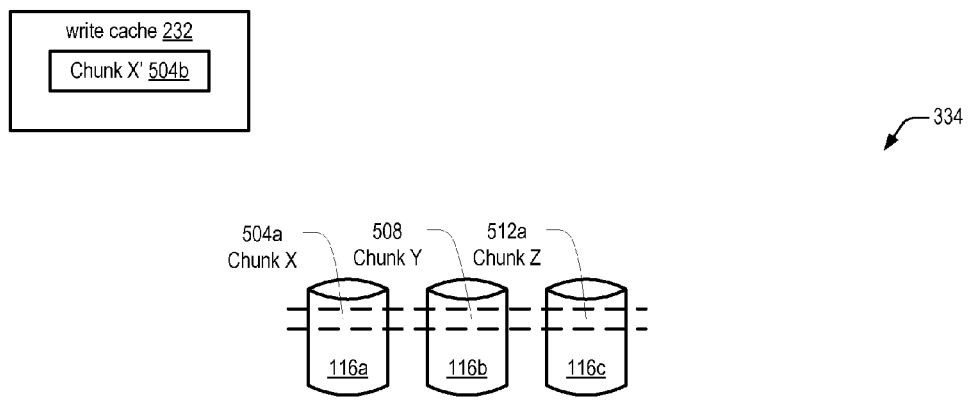
FIG. 5a is a diagram illustrating partial stripe write destage penalties for a three-drive RAID 5 striped volume in accordance with embodiments of the present invention.

Referring now to FIG. 5a, a diagram illustrating partial stripe write destage penalties for a three-drive RAID 5 striped volume 334 in accordance with embodiments of the present invention is shown.

Three-drive RAID 5 striped volume 334 has three storage devices 116, identified as storage devices 116a, 116b, and 116c. A given stripe has identified chunks X 504a, Y 508, and Z 512a. Assume the parity chunk for the given stripe is chunk Z 512. Therefore chunk X 504a and chunk Y 508 are data chunks. Write cache 236 includes chunk X' 504b, which is in dirty portion of cache 416. The given stripe is a partial stripe since only a single data chunk (chunk X' 504b) is in write cache 236, and not a new data for chunk Y 508.

If the process of the present invention requires destage of the given partial stripe to striped volume 334, it will be necessary to recompute a new parity chunk Z' 512b using new data chunk X' 504b and old data chunk Y 508. Therefore, storage controller 108 initially reads chunk Y 508 from storage device 116b. Next, storage controller 108 XOR's chunk Y 508 with chunk X' 504b to obtain new parity chunk Z' 512b. After new parity has been calculated, storage controller 108 writes chunk X' 504a to the chunk X 504 location, and chunk Z' 512b to the chunk Z 512a location. Therefore, for a three-drive RAID 5 striped volume 334, one read and two write operations are required to destage a partial stripe write.

Figure 5B:
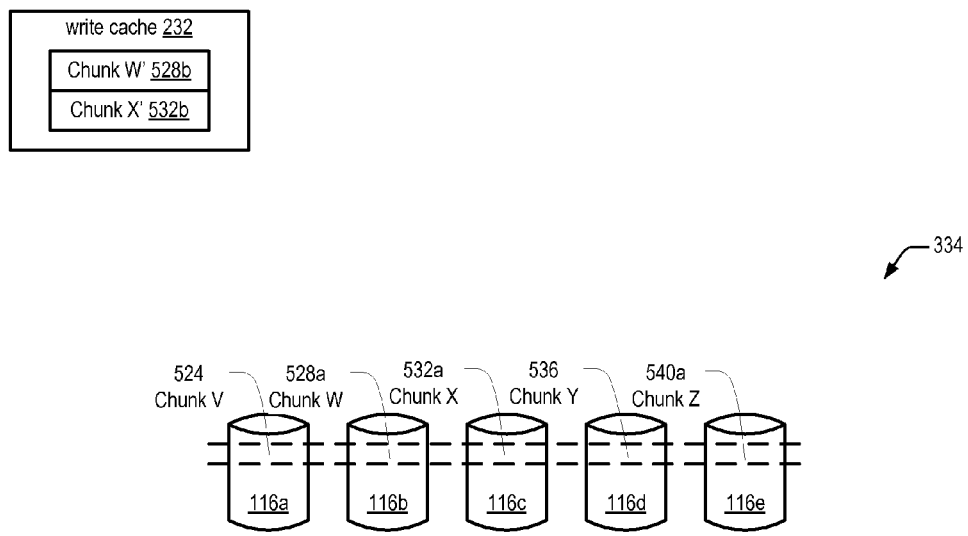
FIG. 5b is a diagram illustrating partial stripe write destage penalties for a five-drive RAID 5 striped volume in accordance with embodiments of the present invention.

Referring now to FIG. 5b, a diagram illustrating partial stripe write destage penalties for a 5-drive RAID 5 striped volume 334 in accordance with embodiments of the present invention is shown.

Five-drive RAID 5 striped volume 334 includes five storage devices 116, identified as storage devices 116a, 116b, 116c, 116d, and 116e. For a given stripe, the chunks involved are chunk V 524, chunk W 528a, chunk X 532a, chunk Y 536, and chunk Z 540a. Assume the parity chunk for the given stripe is chunk Z 540.

The given stripe in write cache 236 includes new data chunk W' 528b and new data chunk X' 532b. Since there is not new data corresponding to chunk V 524 and chunk Y 536, this is a partial stripe write. In order to destage the partial stripe from write cache 236 is first necessary to read chunk V 524 and chunk Y 536. Next, storage controller 108 XOR's chunk V 524, chunk W' 528b, chunk X' 532b, and chunk Y 536 to obtain new parity chunk Z' 540b. Once the new parity chunk Z' 540b has been calculated, storage controller 108 writes new data chunk W' 528b to the chunk W 528a location, new data chunk X' 532b to the chunk X 532a location, and new parity chunk Z' 540b to the chunk Z 540a location.

They can be seen from FIGS. 5a and 5b that the amount of time required to destage a partial stripe from write cache 236 to striped volume 334 depends on the number of chunks involved in the partial stripe. It is therefore desirable to destage as many full stripes as possible compared to partial stripes.

Figure 5C:
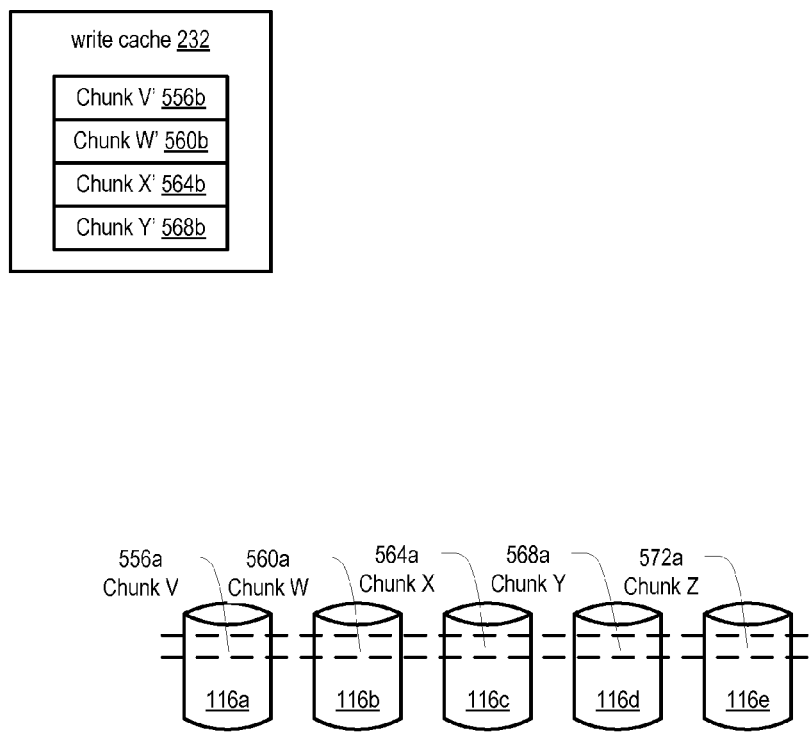
FIG. 5c is a diagram illustrating full stripe write destage penalties for a five-drive RAID 5 striped volume in accordance with embodiments of the present invention.

Referring now to FIG. 5c, a diagram illustrating full stripe write destage penalties for a 5-drive RAID 5 striped volume 334 in accordance with embodiments of the present invention is shown.

Full stripe writes are writes in which all chunks for the given stripe have new data (dirty data) in write cache 236. Five-drive RAID 5 striped volume 334 includes five storage devices 116, identified as storage devices 116a, 116b, 116c, 116d, and 116e. For a given stripe, the chunks involved are chunk V 556a, chunk W 560a, chunk X 564a, chunk Y 568a, and chunk Z 572a. Assume the parity chunk for the given stripe is chunk Z 572.

The given stripe in write cache 236 includes new data chunk V' 556b, new data chunk W' 560b, new data chunk X' 564b, and new data chunk Y' 568b. In order to destage the full stripe from write cache 236, it is first necessary for storage controller 108 to XOR chunk V' 556b, chunk W' 560b, chunk X' 564b, and chunk Y' 568b to obtain new parity chunk Z' 572b. Once the new parity chunk Z' 572b has been calculated, storage controller 108 writes new data chunk V' 556b to the chunk V 556a location, new data chunk W' 560b to the chunk W 560a location, new data chunk X' 564b to the chunk X 564a location, new data chunk Y' 568b to the chunk Y 568a location, and new parity chunk Z' 572b to the chunk Z 572a location. It can be seen that full stripe writes are more efficient than partial stripe writes since no reads of old data from striped volume 334 are required in order to generate the new parity chunk 572b.

Referring now to FIG. 6, exemplary data containers 600 for a 3+1 RAID 5 striped volume 334 in accordance with embodiments of the present invention is shown. The 3+1 RAID 5 striped volume 334 includes four storage devices 116, identified as storage device 116a, storage device 116b, storage device 116c, and storage device 116d. The exemplary striped volume has 14 stripes 604, identified as stripe zero through stripe 13. It should be understood that a striped volume 334 may have any number of storage devices 116 or stripes 604, subject to limitations of RAID technology, striped volume size, and so forth.

The portion of the stripe 604 allocated to a single storage device 116 is a chunk. In the example of FIG. 6, each chunk is divided into eight equal-sized cache elements (CEs). However, in other embodiments, each chunk may have less than or more than eight cache elements. A cache element may be either empty 616, or dirty 620. Only dirty cache elements 620 contain new write data.

In the example of FIG. 6, the striped volume 334 is mapped according to RAID 5 techniques, where a parity chunk rotates across each of the storage devices 116 depending on stripe 604. In one embodiment, parity chunk 608a is assigned to stripe 0 of storage device 116d, parity chunk 608b is assigned to stripe 1 of storage device 116c, and so on.

Data containers 612 are data structures assigned on a stripe basis as new write data is received. Data containers 612 include a status 278, 284, 290 having one of three values: either unknown, partial, or full. When a data container 612 is initially created, the data container 612 has a status 278, 284, 290 of unknown. When new write data is associated with a data container 612, and one or more empty CEs 616 remain, the data container 612 has a status 278, 284, 290 of partial. When new write data is associated with the data container 612, and all CEs of the data container 612 are dirty CEs 620, the data container 612 has a status 278, 284, 290 of full. In the preferred embodiment, data containers 612 are assigned sequentially. However, in other embodiments, data containers 612 may be assigned in any order as long as no two stripes have the same data container 612 number.

Stripe 3 was the first stripe 604 to receive write data in the striped volume 334 of FIG. 6, and therefore is data container 0. Since all CE's of stripe 3 are dirty CE's 620, data container 0 has a status 278, 284, 290 of full.

Stripe 9 was the second stripe 604 to receive write data in the striped volume 334 of FIG. 6, and therefore is data container 1. Since only some but not all CE's of stripe 9 are dirty CE's 620, data container 1 has a status 278, 284, 290 of partial.

Stripe 0 was the third stripe 604 to receive write data in the striped volume 334 of FIG. 6, and therefore is data container 2. Since only some but not all CE's of stripe 0 are dirty CE's 620, data container 2 has a status 278, 284, 290 of partial.

Stripe 5 was the fourth stripe 604 to receive write data in the striped volume 334 of FIG. 6, and therefore is data container 3. Since only some but not all CE's of stripe 5 are dirty CE's 620, data container 3 has a status 278, 284, 290 of partial.

Stripe 13 was the fifth stripe 604 to receive write data in the striped volume 334 of FIG. 6, and therefore is data container 4. Since only some but not all CE's of stripe 13 are dirty CE's 620, data container 4 has a status 278, 284, 290 of partial.

Stripe 10 was the sixth stripe 604 to receive write data in the striped volume 334 of FIG. 6, and therefore is data container 5. Since only some but not all CE's of stripe 10 are dirty CE's 620, data container 5 has a status 278, 284, 290 of partial.

Stripe 4 was the seventh stripe 604 to receive write data in the striped volume 334 of FIG. 6, and therefore is data container 6. Since only some but not all CE's of stripe 4 are dirty CE's 620, data container 6 has a status 278, 284, 290 of partial.

Stripe 12 was the eighth stripe 604 to receive write data in the striped volume 334 of FIG. 6, and therefore is data container 7. Since all CE's of stripe 12 are dirty CE's 620, data container 7 has a status 278, 284, 290 of full.

Stripe 6 was the ninth stripe 604 to receive write data in the striped volume 334 of FIG. 6, and therefore is data container 8. Since all CE's of stripe 6 are dirty CE's 620, data container 8 has a status 278, 284, 290 of full.

Stripe 11 was the tenth stripe 604 to receive write data in the striped volume 334 of FIG. 6, and therefore is data container 9. Since only some but not all CE's of stripe 11 are dirty CE's 620, data container 9 has a status 278, 284, 290 of partial.

Only 10 data containers 612 have been assigned since only 10 stripes 604 have dirty CE's 620 in write cache 232. Stripes 1, 2, 7, and 8 do not have data containers 612 assigned since all CE's in those stripes are empty CE's 616.

Referring now to FIG. 7, a flowchart illustrating an I/O handling process in accordance with embodiments of the present invention is shown. The I/O handling process controls receipt and organization of host write data 404 in the write cache 236. Flow begins at block 704.

At block 704, the storage controller 108 receives a data write command to a striped volume 300, 334 from a host computer 104. Flow proceeds to block 708.

At block 708, storage controller 108 resets a free running timer. The free running timer measures time beginning with the receipt of a new I/O write command, and in some cases initiates a destage of a stripe in write cache 236 to the striped volume 300, 334. In some embodiments, the free running timer is implemented in firmware 228 executed by CPU 204.

In other embodiments, the free running timer is implemented in hardware within the storage controller 108. Flow proceeds to decision block 712.

At decision block 712, the storage controller 108 determines if there is sufficient space in the write cache 236 to store data of the data write command. If there is not sufficient space in the write cache 236 to store write data of the data write command, then flow proceeds to block 716. If there is sufficient space in the write cache 236 to store write data of the data write command, then flow proceeds to block 720.

At block 716, the storage controller 108 waits for write cache 236 space to become available to store the write data of the data write command. Once write cache 236 space becomes available, flow proceeds to block 720.

At block 720, the storage controller 108 allocates the write cache 236. The allocation process for the write cache 236 is illustrated in the flowchart of FIG. 8a. Flow proceeds to block 724.

At block 724, the storage controller 108 requests write command data 404 from the host computer 104 that provided the data write command. Flow proceeds to block 728.

At block 728, the host computer 104 that provided the data write command transfers write command data 404 to the storage controller 108 across host bus or network 112. Flow proceeds to block 732.

At block 732, the storage controller 108 stores the write command data 404 in the allocated write cache 236. At this point, the write data 404 of the data write command is stored in the write cache 236. Flow proceeds to block 736.

At block 736, the storage controller 108 provides a command completion notification to the host computer 104 that provided the data write command. When the host computer 104 receives the command completion, the host computer 104 treats the data write command as a completed command. Flow proceeds to block 740.

At block 740, the storage controller 108 releases the write cache 236. Releasing the write cache 236 is described in more detail with respect to FIG. 8b. Flow proceeds to block 744.

At block 744, the storage controller 108 deletes the data write command to the striped volume 300, 334. Flow proceeds to block 704 to wait for a next data write command.

Referring now to FIG. 8a, a flowchart illustrating a write cache 236 allocation process in accordance with embodiments of the present invention is shown. The process illustrated in FIG. 8a corresponds to block 720 of FIG. 7. Flow begins at block 804.

At block 804, the storage controller 108 allocates cache elements (CEs) 293, 294, 295, . . . 296 in the write cache 236 to store write command data 404. Flow proceeds to block 808.

At block 808, the storage controller 108 decrements the free count 244 by the number of CEs allocated to write command data 404. The free count 244 is the number of free CEs 293, 294, 295, . . . 296 in the write cache 236, and newly added write data 404 from the data write command will reduce the free count 244 accordingly. Flow proceeds to block 812.

At block 812, the storage controller 108 increments the outstanding count 248 by the number of CEs 293, 294, 295, . . . 296 allocated to write command data 404. Flow proceeds to block 724 of FIG. 7.

Referring now to FIG. 8b, a flowchart illustrating a write cache 236 memory release process in accordance with embodiments of the present invention is shown. The process illustrated in FIG. 8b corresponds to block 740 of FIG. 7. Flow begins at block 820.

At block 820, the storage controller 108 updates the dirty count 240 by the number of cache elements (CEs) 293, 294, 295, . . . 296 allocated to store write command data 404. Flow proceeds to block 824.

At block 824, the storage controller 108 updates the partial stripe count 252 and full stripe count 256 based on the number of dirty cache elements (CEs) 620 in each stripe 604 of the striped volume 300, 334. Flow proceeds to block 828.

At block 828, the storage controller 108 decrements the outstanding count 248 by the number of cache elements (CEs) 620 allocated to storage device writes 408. Flow proceeds to block 832.

At block 832, the storage controller 108 updates the stripe map for the striped volume 300, 334. Flow proceeds to block 744 of FIG. 7.

Referring now to FIG. 9, a flowchart illustrating a stripe map update process 832 in accordance with embodiments of the present invention is shown. The process illustrated in FIG. 9 corresponds to block 832 of FIG. 8. Flow begins at block 904.

At block 904, the storage controller 108 identifies a first dirty cache element (CE) 620 in the striped volume 300, 334. In one embodiment, the storage controller 108 searches for dirty cache elements 620 beginning with a first storage device 116a and first stripe 604. In another embodiment, the storage controller 108 searches for dirty cache elements 620 beginning with the last storage device 116d and last stripe 604. In other embodiments, the storage controller 108 searches for dirty cache elements 620 based on some other ordering method. Flow proceeds to decision block 908.

At decision block 908, the storage controller 108 determines if there is an existing data container 612 for the dirty cache element (CE) 620. If the storage controller 108 determines there is not an existing data container 612 for the dirty cache element (CE) 620, then flow proceeds to block 912. If the storage controller 108 determines there is an existing data container 612 for the dirty cache element (CE) 620, then flow proceeds to block 916.

At block 912, the storage controller 108 creates a new data container 612 with the status of "unknown", and assigns the next available data container number to the data container 612. New data containers 612 are assigned when a new dirty cache element (CE) 620 is found for a stripe 604 not previously represented in write cache 236. Flow proceeds to block 920.

At block 916, the storage controller 108 identifies the data container 612 including the dirty cache element (CE) 620. In this case, a data container 612 already exists for the stripe 604 in the write cache 236 containing the dirty cache element (CE) 620. Flow proceeds to block 920.

At block 920, the storage controller 108 attaches the dirty cache element (CE) 620 to the data container 612. Flow proceeds to block 924.

At block 924, the storage controller 108 updates the cache element (CE) count 280, 286, 292 in the data container 612. The cache element (CE) count 280, 286, 292 is the number of dirty cache elements 620 the data container 612. Flow proceeds to block 928.

At block 928, the storage controller 108 updates the partial 252 or full stripe count 256 if the stripe 604 including the cache element (CE) transitions to either a partial stripe or a full stripe, respectively. For a new data container 612, the partial stripe count 252 is incremented. For an existing data container 612 the full stripe count 256 is incremented if all cache elements in the stripe corresponding to the existing data container 612 are dirty cache elements 620. Correspondingly, the partial stripe count 252 is decremented if the full stripe count 256 is incremented. Flow proceeds to block 932.

At block 932, the storage controller 108 updates the data container status 278, 284, 290 if the stripe 604 including the cache element (CE) transitions to either a partial stripe or a full stripe, respectively. For a new data container 612, the data container status 278, 284, 290 is "partial". For an existing data container 612 the data container status 278, 284, 290 is "full" if all cache elements in the stripe corresponding to the existing data container 612 are dirty cache elements 620. Flow proceeds to decision block 936.

At decision block 936, the storage controller 108 determines if there are more dirty cache elements (CEs) 620 in the write cache 236. If the storage controller 108 determines there are not more dirty cache elements (CEs) 620 in the write cache 236, then flow ends. If the storage controller 108 determines there are more dirty cache elements (CEs) in the write cache 236, then flow proceeds to block 940.

At block 940, the storage controller 108 identifies a next dirty cache element (CE) 620 in the write cache 236. In one embodiment, the next dirty cache element (CE) 620 is the next sequential dirty cache element (CE) 620 in the write cache 236. Flow proceeds to decision block 908.

Referring now to FIG. 10, a flowchart illustrating a stripe 604 destage process in accordance with embodiments of the present invention is shown. Flow begins at blocks 1004 and 1008.

At block 1004, the storage controller 108 free running timer times out. The free running timer started counting at block 708 of FIG. 7 when a new data write command was received by the storage controller 108. The free running timer times out when the storage controller 108 is either idling in the absence of received data write commands, or the cache low watermark 272 has not yet been reached. Flow proceeds to block 1012.

At block 1008, the storage controller 108 determines if the dirty count 240 for the striped volume 300, 334 is at least as high as the cache low watermark 272. This is the normal destage condition when the storage controller 108 is actively processing write requests 404 from host computers 104. In another embodiment, the storage controller 108 determines if the dirty count 240 for the striped volume 300, 334 is higher than the cache low watermark 272. Flow proceeds to block 1012.

At block 1012, the storage controller 108 determines the next logical block address (LBA) containing a dirty cache element (CE) 620 following the last destaged LBA 274. The last destaged LBA 274 is updated in block 1052, following a previous stripe destage operation. Flow proceeds to block 1016.

At block 1016, the storage controller 108 calculates the full stripe write percentage 260 for the striped volume 300, 334. The full stripe write percentage 260 calculation process is illustrated in FIG. 11a, and an example is illustrated in FIG. 11b. Flow proceeds to decision block 1020.

At decision block 1020, the storage controller 108 determines if the full stripe write percentage 260 is greater than a full stripe write affinity value 264. In another embodiment, the storage controller 108 determines if the full stripe write percentage 260 is greater than or equal to the full stripe write affinity value 264. The full stripe write affinity value 264 is the likelihood that a full stripe will be destaged from the write cache 236. This value is best determined by empirical testing, and depends on the frequency and locality of reference of host data writes, the size of the write cache 236, and the time required to destage partial or full stripes from the write cache 236. In one embodiment, the full stripe write affinity value 264 is 50%. In another embodiment, the full stripe write affinity value 264 is 60%. However, in other embodiments, the full stripe write affinity value 264 is different than either 50% or 60%. If the full stripe write percentage 260 is greater than or equal to the full stripe write affinity value 264, then flow proceeds to block 1024. If the full stripe write percentage 260 is not greater than or equal to the full stripe write affinity value 264, then flow proceeds to block 1036.

At block 1024, the storage controller 108 identifies the next full stripe write in the write cache 236 for the striped volume 300, 334. The next full stripe write in the write cache 236 is identified by sequentially searching data container status 278, 284, 290 of data containers 276, 282, 288, respectively. Data containers 276, 282, 288 have a status of either 'unknown', 'partial' or 'full'. Flow proceeds to block 1028.

At block 1028, the storage controller 108 destages the identified next full stripe write from block 1024 to storage devices 116 of the striped volume 300, 334. Destaging includes copying the identified full stripe write from the write cache 236 to the striped volume 300, 334. Flow proceeds to block 1032.

At block 1032, the storage controller 108 decrements the full stripe count 256 for the striped volume 300, 334, since a full stripe write was destaged in block 1028. Flow proceeds to block 1048.

At block 1036, the storage controller 108 identifies the next data container in the write cache 236 for the striped volume 300, 334. The next data container in the write cache 236 is identified by sequentially searching data container numbers 276, 282, 288. Flow proceeds to block 1040.

At block 1040, the storage controller 108 destages the stripe corresponding to the identified data container 276, 282, 288 from block 1036 to storage devices 116 of the striped volume 300, 334. Destaging includes copying the identified dirty cache elements 620 from the write cache 236 to the striped volume 300, 334. Flow proceeds to block 1044.

At block 1044, the storage controller 108 decrements the partial stripe count 252 for the striped volume 300, 334, if a partial stripe write was destaged in block 1040. Alternatively, the storage controller 108 decrements the full stripe count 256 for the striped volume 300, 334, if a full stripe write was destaged in block 1040. Flow proceeds to block 1048.

At block 1048, the storage controller 108 decrements the dirty count 240 and increments the free count 244 by the number of dirty cache elements (CEs) 620 destaged. If a partial stripe write was destaged, the number of dirty cache elements (CEs) 620 destaged is the number of dirty cache elements (CEs) 620 in the identified partial stripe of block 1036. If a full stripe write was destaged, the number of dirty cache elements (CEs) 620 destaged is the number of dirty cache elements (CEs) 620 in the identified full stripe of block 1024. Flow proceeds to block 1052.

At block 1052, the storage controller 108 updates the last staged LBA 274 to reflect the LBA of the destaged partial stripe write in block 1040 or full stripe write in block 1028. This step saves the LBA of the last destaged stripe so that a next LBA can be calculated in block 1012. Flow proceeds to block 1056.

At block 1056, the storage controller 108 resets the free-running timer to begin counting again. This step resumes the timer in order to destage a stripe 604 if the timer times out, in block 1004. Flow ends at block 1056.

Referring now to FIG. 11a, a flowchart illustrating a calculation of full stripe write percentage 1016 in accordance with embodiments of the present invention is shown. Flow begins at block 1104.

At block 1104, the storage controller 108 obtains a partial stripe count 252 and a full stripe count 256 from memory 212. The partial stripe count 252 is the current number of partial stripes in the write cache 236, and the full stripe count 256 is the current number of full stripes in the write cache 236. Flow proceeds to block 1108.

At block 1108, the storage controller 108 divides the full stripe count 256 by the sum of the partial stripe count 252 and the full stripe count 256, and multiplies by 100 to obtain the full stripe write percentage 260. Flow proceeds to decision block 1020.

Referring now to FIG. 11b, a diagram illustrating an exemplary full stripe write percentage 260 calculation in accordance with embodiments of the present invention is shown.

The full stripe write percentage 260 is equal to the number of full stripes in the striped volume 256 divided by the sum of the number of partial stripes in the striped volume 252 and the number of full stripes in the striped volume 256, multiplied by 100. In the example of FIG. 11b, the partial stripe count 252 is equal to 80, and the full stripe count 256 is equal to 50. Therefore the full stripe write percentage 260 is equal to 50 divided by 80+50, or 50 divided by 130, or 38%.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method for destaging data from a memory of a storage controller to a striped volume, comprising:
   determining, by a processor of the storage controller, if a stripe should be destaged from a write cache of the storage controller to the striped volume;
   if a stripe should be destaged:
      destaging, by the storage controller, a partial stripe from the write cache if a full stripe write percentage is less than a full stripe write affinity value; and
      destaging, by the storage controller, a full stripe from the write cache if the full stripe write percentage is greater than the full stripe write affinity value,
   wherein the full stripe write percentage comprises a full stripe count divided by the sum of the full stripe count and a partial stripe count, wherein the full stripe count is the number of stripes of the striped volume in the write cache wherein all chunks of a stripe are dirty, wherein the partial stripe count is the number of stripes of the striped volume in the write cache wherein at least one chunk but less than all chunks of the stripe are dirty.

2. The method of claim 1, wherein the striped volume comprises a plurality of storage devices, wherein the plurality of storage devices comprises a plurality of stripes, wherein a chunk is the data in a stripe corresponding to a single storage device of the striped volume, wherein dirty chunks are chunks comprising write data in the write cache that have not been written to the striped volume, wherein a chunk comprises a fixed number of cache elements.

3. The method of claim 2, determining if a stripe should be destaged from the write cache comprising at least one of:
   receiving, by the processor, an indication that a free-running timer of the storage controller has timed out; and
   observing, by the processor, a dirty count is at least as high as a cache low watermark,
   wherein the dirty count is the current number of cache elements of the striped volume in the write cache containing dirty data, wherein the dirty count and the cache low watermark are stored in the memory.

4. The method of claim 3, wherein after determining if a stripe should be destaged from the write cache and prior to destaging the stripe the method further comprising:
   identifying a next Logical Block Address comprising a dirty cache element following a last destaged Logical Block Address; and
   calculating the full stripe write percentage for the striped volume.

5. The method of claim 3, wherein after destaging the stripe the method further comprising:
   decrementing, by the processor, the full stripe count if a full stripe write was destaged to the striped volume;
   decrementing, by the processor, the partial stripe count if a partial stripe write was destaged to the striped volume;
   decrementing, by the processor, the dirty count by the number of cache elements destaged;
   incrementing, by the processor, a free count by the number of dirty cache elements destaged;
   updating, by the processor, a last destaged Logical Block Address to reflect the Logical Block Address of the destaged stripe; and
   resetting, by the processor, the free-running timer.

6. The method of claim 2, wherein after the storage controller receives a data write command and stores write data of the data write command in the memory, the method further comprising:
   updating, by the processor, the dirty count by the number of cache elements required to store the write data in the write cache;
   updating, by the processor, the partial stripe count and the full stripe count based on the number of partial stripes and full stripes of the striped volume, respectively, in the write cache;
   decrementing, by the processor, an outstanding count by the number of cache elements allocated to the write data; and
   updating, by the processor, a stripe map for the striped volume.

7. The method of claim 6, updating the stripe map for the striped volume further comprising:
   identifying, by the processor, a dirty cache element corresponding to the data write command for the striped volume in the write cache;
   determining, by the processor, if a data container exists for the dirty cache element;
      if a data container exists for the dirty cache element, finding, by the processor, a data container number for the dirty cache element; and
      if a data container does not exist for the dirty cache element:
   creating, by the processor, a new data container with a first status value; and
   assigning, by the processor, a next available data container number to the dirty cache element;
   attaching, by the processor, the dirty cache element to the data container number;
   updating, by the processor, a cache element count for the data container;
   updating, by the processor, one of the partial stripe count and the full stripe count if the stripe comprising the dirty cache element becomes either a partial stripe or a full stripe, respectively;
   determining, by the processor, if more dirty cache elements corresponding to the data write command are in the write cache;

if more dirty cache elements corresponding to the data write command are in the write cache:
identifying a next dirty cache element for the striped volume in the write cache; and
repeating the steps for updating the stripe map for the striped volume.

8. The method of claim 7, wherein the stripe comprising the dirty cache element becomes a partial stripe if less than all chunks of the stripe are dirty chunks, wherein the stripe comprising the dirty cache element becomes a full stripe if all chunks of the stripe are dirty chunks, wherein the processor updates the data container status for the stripe to partial if the stripe becomes a partial stripe, wherein the processor updates the data container status for the stripe to full if the stripe becomes a full stripe.

9. The method of claim 8, wherein the full stripe write affinity value is the likelihood that a full stripe will be destaged from the write cache to the striped volume.

10. A storage controller for efficiently destaging data to a striped volume coupled to the storage controller, comprising:
a processor; and
a memory, coupled to the processor, comprising:
a write cache for temporarily storing write data specified in a data write command;
a full stripe write percentage; and
a full stripe write affinity value,
wherein the processor determines if a stripe should be destaged from the write cache to the striped volume, wherein if the processor determines if a stripe should be destaged, the storage controller destages a partial stripe from the write cache if the full stripe write percentage is less than the full stripe write affinity value and destages a full stripe from the write cache if the full stripe write percentage is greater than the full stripe write affinity value, wherein the full stripe write percentage comprises a full stripe count divided by the sum of the full stripe count and a partial stripe count, wherein the full stripe count is the number of stripes of the striped volume in the write cache wherein all chunks of a stripe are dirty, wherein the partial stripe count is the number of stripes of the striped volume in the write cache wherein at least one chunk but less than all chunks of the stripe are dirty.

11. The storage controller of claim 10, wherein the striped volume comprises a plurality of storage devices, wherein the plurality of storage devices comprises a plurality of stripes, wherein a chunk is the data in a stripe corresponding to a single storage device of the striped volume, wherein dirty chunks are chunks comprising write data in the write cache that have not been written to the striped volume, wherein a chunk comprises a fixed number of cache elements.

12. The storage controller of claim 11, wherein the processor determines if a stripe should be destaged from the write cache comprising at least one of:
the processor receives an indication that a free-running timer of the storage controller has timed out; and
the processor observes a dirty count is at least as high as a cache low watermark,
wherein the dirty count is the current number of cache elements of the striped volume in the write cache containing dirty data, wherein the dirty count and the cache low watermark are stored in the memory.

13. The storage controller of claim 12, wherein after determining if a stripe should be destaged from the write cache and prior to destaging the stripe the processor identifies a next Logical Block Address comprising a dirty cache element following a last destaged Logical Block Address and calculates the full stripe write percentage for the striped volume.

14. The storage controller of claim 12, wherein after destaging the stripe the processor decrements the full stripe count if a full stripe write was destaged to the striped volume, decrements the partial stripe count if a partial stripe write was destaged to the striped volume, decrements the dirty count by the number of cache elements destaged, increments a free count by the number of dirty cache elements destaged, updates a last destaged Logical Block Address to reflect the Logical Block Address of the destaged stripe, and resets the free-running timer.

15. The storage controller of claim 11, wherein after the storage controller receives a data write command and stores write data of the data write command in the memory, the processor updates the dirty count by the number of cache elements required to store the write data in the write cache, updates the partial stripe count and the full stripe count based on the number of partial stripes and full stripes of the striped volume, respectively, in the write cache, decrements an outstanding count by the number of cache elements allocated to the write data, and updates a stripe map for the striped volume.

16. The storage controller of claim 15, wherein the processor updates the stripe map for the striped volume comprises the processor identifies a dirty cache element corresponding to the data write command for the striped volume in the write cache, determines if a data container exists for the dirty cache element, finds a data container number for the dirty cache element if a data container exists for the dirty cache element and creates a new data container with a first status value and assigns a next available data container number to the dirty cache element if a data container does not exist for the dirty cache element, attaches the dirty cache element to the data container number, updates a cache element count for the data container, updates one of the partial stripe count and the full stripe count if the stripe comprising the dirty cache element becomes either a partial stripe or a full stripe, respectively, and determines if more dirty cache elements corresponding to the data write command are in the write cache, wherein if more dirty cache elements corresponding to the data write command are in the write cache, the processor identifies a next dirty cache element for the striped volume in the write cache and repeats the steps for updating the stripe map for the striped volume.

17. The storage controller of claim 16, wherein the stripe comprising the dirty cache element becomes a partial stripe if less than all chunks of the stripe are dirty chunks, wherein the stripe comprising the dirty cache element becomes a full stripe if all chunks of the stripe are dirty chunks, wherein the processor updates the data container status for the stripe to partial if the stripe becomes a partial stripe, wherein the processor updates the data container status for the stripe to full if the stripe becomes a full stripe.

18. The storage controller of claim 10, wherein the full stripe write affinity value is the likelihood that a full stripe will be destaged from the write cache to the striped volume.

19. A system for efficiently destaging data, comprising:
a host computer for generating data write commands;
a storage system coupled to the host computer, comprising
a storage controller, the storage controller comprising:
a processor; and
a memory, coupled to the processor, comprising:
a write cache for temporarily storing write data specified in the data write commands;
a full stripe write percentage; and
a full stripe write affinity value;

a striped volume coupled to the storage controller, the striped volume comprising a plurality of storage devices configured as a parity-based RAID volume, wherein the processor determines if a stripe should be destaged from the write cache to the striped volume, wherein if the processor determines if a stripe should be destaged, the storage controller destages a partial stripe from the write cache if the full stripe write percentage is less than the full stripe write affinity value and destages a full stripe from the write cache if the full stripe write percentage is greater than the full stripe write affinity value, wherein the full stripe write percentage comprises a full stripe count divided by the sum of the full stripe count and a partial stripe count, wherein the full stripe count is the number of stripes of the striped volume in the write cache wherein all chunks of a stripe are dirty, wherein the partial stripe count is the number of stripes of the striped volume in the write cache wherein at least one chunk but less than all chunks of the stripe are dirty.

20. The system of claim 19, wherein the plurality of storage devices comprises a plurality of stripes, wherein a chunk is the data in a stripe corresponding to a single storage device of the striped volume, wherein dirty chunks are chunks comprising write data in the write cache that have not been written to the striped volume, wherein a chunk comprises a fixed number of cache elements.

* * * * *